United States Patent
Taira et al.

(10) Patent No.: US 8,457,766 B2
(45) Date of Patent: Jun. 4, 2013

(54) SAFETY CONTROLLER AND SAFETY CONTROL METHOD

(75) Inventors: Tetsuya Taira, Nisshin (JP); Hiroshi Bitoh, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/498,829

(22) PCT Filed: Jan. 31, 2011

(86) PCT No.: PCT/JP2011/000525
§ 371 (c)(1),
(2), (4) Date: Mar. 28, 2012

(87) PCT Pub. No.: WO2012/104897
PCT Pub. Date: Aug. 9, 2012

(65) Prior Publication Data
US 2012/0245709 A1    Sep. 27, 2012

(51) Int. Cl.
*G05B 9/02* (2006.01)
*G06F 9/46* (2006.01)

(52) U.S. Cl.
USPC .............................. 700/21; 700/79; 718/104

(58) Field of Classification Search
None
See application file for complete search history.

(56) References Cited

U.S. PATENT DOCUMENTS

| | | | |
|---|---|---|---|
| 8,156,251 B1 * | 4/2012 | Sorensen et al. | 710/2 |
| 2009/0210879 A1 | 8/2009 | Kaiser et al. | |
| 2012/0191226 A1 * | 7/2012 | Nordberg et al. | 700/79 |

FOREIGN PATENT DOCUMENTS

| | | |
|---|---|---|
| JP | 62-245304 A | 10/1987 |
| JP | 06-282301 A | 10/1994 |
| JP | 06-332338 A | 12/1994 |
| JP | 2000-207228 A | 7/2000 |
| JP | 2002-086379 A | 3/2002 |
| JP | 2003-036177 A | 2/2003 |
| JP | 2004-258875 A | 9/2004 |
| JP | 2005-063295 A | 3/2005 |
| JP | 2008-191823 A | 8/2008 |
| JP | 2006-109076 A | 4/2009 |
| JP | 2010-271759 A | 12/2010 |

OTHER PUBLICATIONS

International Search Report mailed Feb. 22, 2011 of PCT/JP2011-000525.
International Preliminary Report on Patentability mailed Jun. 8, 2011 of PCT/JP2011/000525.

* cited by examiner

*Primary Examiner* — Ryan Jarrett
(74) *Attorney, Agent, or Firm* — Kenyon & Kenyon LLP

(57) ABSTRACT

Time partitions which need not be executed can be skipped. An OS partially includes a partition scheduler which selects and decides a time partition to be subsequently scheduled in accordance with a scheduling pattern including TP1 in which an execution time is allocated to a safety monitoring program, TP2 in which the execution time is allocated to a normal control program, and TP 3 in which the execution time is allocated to a safety control program. A processor executes the OS to cause the partition scheduler to periodically operate. The partition scheduler skips a TP including a program which need not be executed among TPs included in the scheduling pattern, in response to a notification of an execution result from a program executed in at least one of the time partitions TP1 to TP3.

10 Claims, 11 Drawing Sheets

SAFETY CONTROLLER AND SAFETY CONTROL METHOD

This is a 371 national phase application of PCT/JP2011/000525 filed 31 Jan. 2011, the contents of which are incorporated herein by reference.

TECHNICAL FIELD

The present invention relates to a safety controller mounted in a service robot, transportation equipment, and the like to ensure functional safety, and particularly to a safety controller using a computer system.

BACKGROUND ART

Service robots are required to ensure functional safety by constantly monitoring a safety state using an external sensor and a self-diagnosis device and by executing appropriate safety control logic upon detecting some risk.

IEC 61508 has been established as an international standard for functional safety of the service robots described above as well as systems which operate on an electrical principle, such as transportation equipment. In IEC 61508, a system provided to ensure functional safety is called a safety-related system. IEC 61508 defines various techniques for constructing the safety-related system using hardware, such as a microprocessor and a PLC (Programmable Logic Controller), and a computer program (software). The use of techniques defined in IEC 61508 makes it possible to construct the safety-related system using a computer system.

Meanwhile, in recent years, the throughput of programmable electronic devices, such as a microprocessor, has been improved. Accordingly, various application programs are executed in parallel on a computer system by using a multi-task OS (Operating System), thereby enabling integration of computer systems which are mounted in equipment, such as a service robot and a vehicle, for various purposes.

Patent Literature 1, for example, discloses a technique for causing an application program related to ensuring of functional safety (hereinafter, referred to as "safety-related application") to run on a computer system together with another application program (hereinafter, referred to as "non-safety-related application").

When the techniques defined in IEC 61508 are applied to the entire software including the safety-related application and the non-safety-related application, a need arises to apply the techniques also to the non-safety-related application. This causes a problem of an increase in software development cost.

Thus, in the technique disclosed in Patent Literature 1, safety-related applications (a safety monitoring program and a safety control program) are made independent from a non-safety-related application (a normal control program) by time partitioning of a system program. Accordingly, the normal control program can be excluded from the safety-related system, which contributes to a reduction in cost of the safety-related system constructed using a computer system.

CITATION LIST

Patent Literature

[Patent Literature 1] Japanese Unexamined Patent Application Publication No. 2010-271759

SUMMARY OF INVENTION

Technical Problem

However, a safety controller of a related art as illustrated in Patent Literature 1 has problems as described below.

A first problem will be first described in detail with reference to FIG. 11A. Note that in FIG. 11A, TP1 represents a time partition for executing the safety monitoring program; TP2 represents a time partition for executing the normal control program; and TP3 is a time partition for executing the safety control program.

The system program according to the related art switches time partitions in accordance with a predetermined fixed scheduling pattern. For this reason, if an abnormality occurs when scheduling is performed in accordance with a scheduling pattern (fixed pattern) during normal control as shown in the upper part of FIG. 11A, for example, the scheduling pattern is switched to a scheduling pattern (fixed pattern) during safety control as shown in the lower part of FIG. 11A. After that, scheduling is performed in accordance with the scheduling pattern (fixed pattern) during safety control.

However, upon occurrence of an abnormality, an immediate response may be required depending on the type of the abnormality. To deal with such an abnormality, when scheduling is executed in accordance with the scheduling pattern during the safety control as shown in the lower part of FIG. 11A, for example, not only TP3, which is required to be immediately executed to deal with the abnormality, but also TP1, which need not be executed to deal with the occurring abnormality, is repeatedly executed. For this reason, also TP1 included as a fixed pattern has to be executed, despite the fact that TP3 needs to be executed immediately and continuously until safety is ensured.

Thus, there is a problem that only the time partition for executing the safety control program cannot be executed immediately and continuously upon occurrence of an abnormality, and the execution of the processing using the safety control program is delayed, with the result that the safety control may not be appropriately performed upon occurrence of an abnormality.

Next, a second problem will be described in detail with reference to FIGS. 12 and 13. Note that FIG. 12 shows a specific example of the scheduling pattern during the normal control according to the related art. FIG. 13 shows a specific example of a procedure related to the task initialization processing using the system program according to the related art.

In a system program including a time partitioning function, it is necessary to provide a time resource (time partition) for executing tasks in order to execute the tasks generated by the safety monitoring program and the like. In order to provide the time partition to execute the tasks, it is necessary to perform initialization processing prior to execution of normal task processing. Additionally, at least one time partition is required for the task initialization processing.

Assume herein that the system program according to the related art executes scheduling in accordance with a basic scheduling pattern as illustrated in FIG. 12. Here, an example is described in which all types of time partitions (in this case, TP1, TP2, and TP3) are included in one cycle as the basic scheduling pattern.

FIG. 13 shows a specific example of a procedure related to the task initialization processing using the system program according to the related art. In FIG. 13, the partition scheduler causes tasks related to TPX (TP selected from TP1 to TP3) to operate (S111), and the initialization processing for the tasks related to TPX is sequentially executed until the initialization processing for the tasks related to all the time partitions is completed (S112 to S114). When the initialization processing for the tasks related to all the time partitions is completed, the partition scheduler operates the tasks related to TPX, and after that, execution of the normal task processing is started (S115).

Accordingly, when the system program according to the related art executes the scheduling in accordance with the basic scheduling pattern (for example, FIG. 12) based on the procedure illustrated in FIG. 13, the initialization processing for the tasks related to all the time partitions (TP1, TP2, and TP3) is first executed in at least one time partition in a first cycle. After completion of the initialization processing for all the tasks, the normal task processing can be started in time partitions included in second and subsequent cycles.

If no abnormality occurs, however, the normal task processing for TP3 is not executed. Accordingly, no task is to be executed in TP3 included in the second and subsequent cycles. In other words, when the initialization processing for the tasks related to TP3 in the first cycle is completed, there is no task to be executed in TP3, which is included in the second and subsequent cycle, except for tasks to be executed upon occurrence of an abnormality. Therefore, under such circumstances that an abnormality hardly occurs after completion of the initialization processing for the tasks related to all TPs, unnecessary TP3 is actually scheduled.

It is preferable to secure a longer execution time for the tasks generated by the normal control program, as compared to that for the tasks generated by the safety monitoring program, for example. In the related art, unnecessary TP3 is scheduled even after completion of the initialization processing. This results in a problem that it is difficult to allocate a longer period of time to the execution time (TP2) for the tasks generated by the normal control program.

As a result of dedicated study about the related art disclosed in Patent Literature 1, the inventors of the present invention have found that the following problem occurs for the following reasons.

First, in an OS 100 disclosed in Patent Literature 1, a safety monitoring process 21 selects a scheduling pattern to define the order and timing for switching time partitions, and the OS 100 performs partition scheduling in accordance with the scheduling pattern (see paragraphs 0036 and 0039, FIG. 4, etc. of Patent Literature 1). In short, a technique is disclosed in which the OS 100 switches time partitions in accordance with a fixed scheduling pattern specified by the safety monitoring process 21.

Accordingly, the partition switching in the OS 100 disclosed in Patent Literature 1 depends on the selection result obtained by the safety monitoring processing 21 in TP1. For this reason, TP1, which is originally scheduled in the scheduling pattern, cannot be skipped. Further, the OS 100 disclosed in Patent Literature 1 merely performs monitoring of the running status of the normal control process 22 and monitoring of input and output data to and from an I/O port 12 by the safety monitoring process 21 in TP1 (see paragraph 0036 etc. of Patent Literature 1). Accordingly, the OS 100 cannot select and decide any TP to be skipped in consideration of the running status of the safety control process 23 and of the safety monitoring process 21 itself.

Thus, in the OS 100 disclosed in Patent Literature 1, the partition scheduling function is not independent from processes generated in each time partition, and it is impossible for the partition scheduling function to grasp running statuses of all the processes. This causes a problem that time partitions which need not be executed cannot be skipped. As a result, the above-mentioned problems cannot be solved.

The present invention has been made based on the above findings, and has an object to provide a safety controller and a safety control method which are capable of skipping time partitions which need not be executed.

Solution to Problem

A safety controller according to an aspect of the present invention includes: a hardware resource including at least one processor; (a) a safety monitoring program for motoring occurrence of an abnormality related to a control target; (b) a normal control program related to a control of the control target during normal time; and (c) a system program for controlling allocation of an execution time of the processor with respect to the safety control program related to the control of the control target upon occurrence of an abnormality. The system program partially includes a partition scheduler that selects and decides a time partition to be subsequently scheduled in accordance with a scheduling pattern including: (d) a first time partition in which the execution time is allocated to the safety monitoring program; (e) a second time partition in which the execution time is allocated to the normal control program; and (f) a third time partition in which the execution time is allocated to the safety control program. The processor executes the system program to cause the partition scheduler to operate periodically. The partition scheduler skips a time partition including a program which need not be executed among time partitions included in the scheduling pattern, in response to a notification of an execution result from a program executed in at least one of the first to third time partitions.

According to an aspect of the present invention described above, the partition scheduler can grasp statuses related to time partitions in an integrated fashion, thereby making it possible to skip time partitions which need not be executed.

Upon reception of the notification of the execution result indicating that an abnormality has been detected by the safety monitoring program executed in the first time partition, the partition scheduler may skip time partitions other than the third time partition in a subsequent scheduling. As a result, only the time partition for executing the safety control program can be executed immediately and continuously upon occurrence of an abnormality, so that a safety control can be appropriately performed upon occurrence of an abnormality.

Further, the partition scheduler may skip the third time partition in a subsequent scheduling upon execution and completion of program initialization processing in each of the first to third time partitions. As a result, a longer execution time can be allocated to the normal control program.

Furthermore, the safety controller further includes a reset circuit that resets the hardware resource. The partition scheduler may output a reset instruction signal to the reset circuit in response to a notification indicating an abnormality including an emergency stop from a program executed in at least one of the first to third time partitions, and the reset circuit may reset the hardware resource upon reception of the reset instruction signal.

Moreover, the safety controller further includes a reset circuit that resets the hardware resource. The partition scheduler may periodically transmit a signal to the reset circuit, and may suspend transmission of the signal to the reset circuit in response to a notification indicating an abnormality including an emergency stop from a program executed in at least one of the first to third time partitions. The reset circuit may reset the hardware resource when the transmission of the signal from the partition scheduler is interrupted.

Advantageous Effects of Invention

According to the present invention, it is possible to provide a safety controller and a safety control method which are capable of skipping time partitioning which need not be executed.

DESCRIPTION OF EMBODIMENTS

Figure 1:
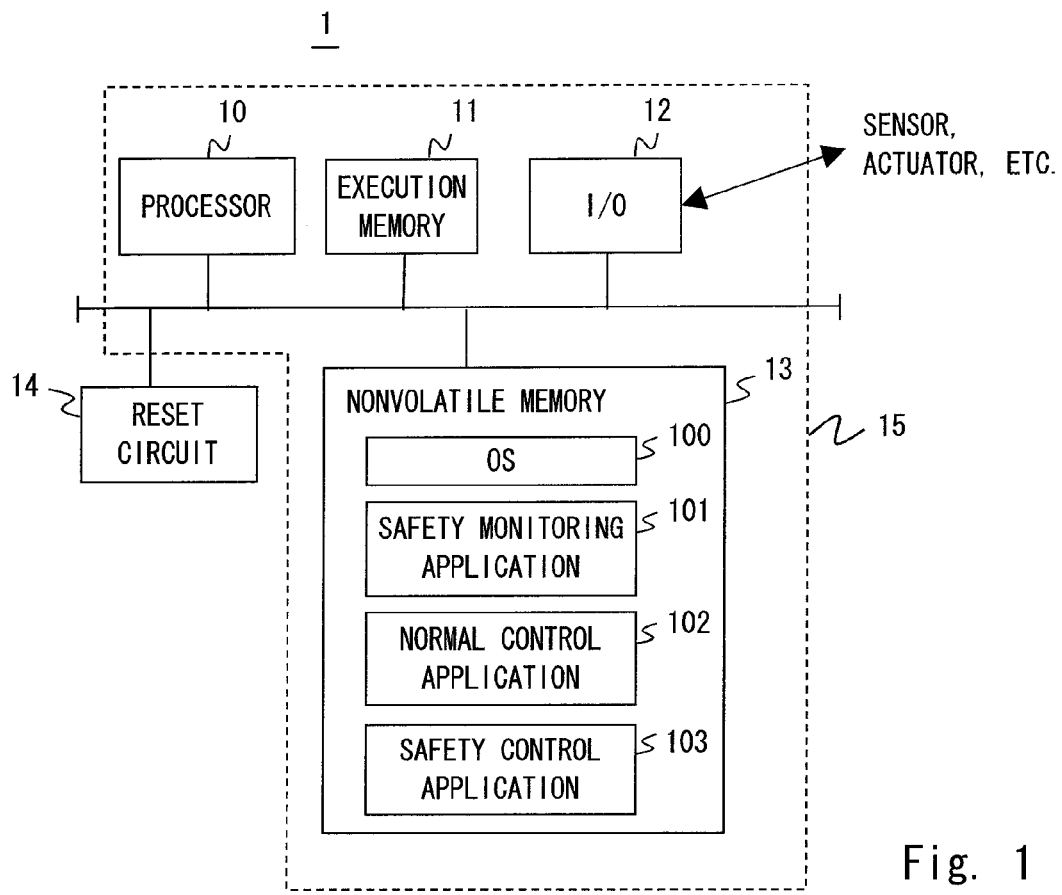
FIG. 1 is a block diagram showing a configuration example of a safety controller according to a first embodiment of the invention.

Exemplary embodiments of the present invention will be described in detail below with reference to the drawings. Throughout the drawings, the same components are denoted by the same reference numerals, and a repeated explanation thereof is omitted as needed for clarity of the explanation.

First Embodiment of the Invention

A safety controller 1 according to this embodiment is mounted in a service robot, transportation equipment, or the like and executes safety control for ensuring functional safety. The safety controller 1 is configured to execute a safety-related application and a non-safety-related application in one computer system. FIG. 1 is a block diagram showing a configuration example of the safety controller 1 according to this embodiment.

A processor 10 fetches programs (instruction stream), decodes instructions, and carries out arithmetic processing according to the result of instruction decoding. Though only one processor 10 is illustrated in FIG. 1, the safety controller 1 may have a multiprocessor configuration including a plurality of processors 10. The processor 10 may be a multicore processor. The processor 10 executes an operating system (OS) 100 as a system program to thereby provide a multiprogramming environment. The multiprogramming environment means an environment in which a plurality of programs are assumed to be executed in parallel by periodically switching a plurality of programs to be executed or by switching programs to be executed upon generation of an event.

Multiprogramming is sometimes called a multiprocess, multithread, multitask, or the like. Each of a process, a thread, and a task indicates a program unit to be executed in parallel in the multiprogramming environment. The multiprogramming environment included in the processor 10 according to this embodiment may be a multiprocess environment or a multithread environment.

An execution memory 11 is a memory used for the processor 10 to execute programs. The execution memory 11 stores programs (OS 100, applications 101 to 103, etc.), which are loaded from a nonvolatile memory 13, input and output data to and from the processor 10, and the like. Note that the processor 10 may directly execute these programs from the nonvolatile memory 13 without loading the programs from the nonvolatile memory 13 into the execution memory 11.

Specifically, the execution memory 11 may be a randomly accessible volatile memory such as an SRAM (Static Random Access Memory) or a DRAM (Dynamic Random Access Memory). The execution memory 11 of FIG. 1 shows logical units. That is, the execution memory 11 may be implemented as a combination of a plurality of SRAM devices, a combination of a plurality of DRAM devices, or a combination of an SRAM device and a DRAM device, for example.

An I/O port 12 is used for data transmission and reception to and from external devices. When the safety controller 1 is mounted in a service robot, for example, the external devices are a visual sensor capable of measuring obstacles around the service robot, an actuator for causing the service robot to operate, and the like.

The nonvolatile memory 13 is a memory device capable of maintaining storage contents more stably than the execution memory 11 without being supplied with power. The nonvolatile memory 13 is, for example, a ROM (Read Only Memory), a flash memory, a hard disk drive, an optical disk drive, or a combination thereof. The nonvolatile memory 13 stores the OS 100 and the applications 101 to 103. Note that at least a part of the nonvolatile memory 13 may be configured to be removable from the safety controller 1. For example, the memory storing the applications 101 to 103 may be removably mounted. Alternatively, at least a part of the nonvolatile memory 13 may be disposed outside the safety controller 1.

The OS 100 is executed by the processor 10 so as to perform task management including task scheduling, interrupt management, time management, and resource management, and to provide a mechanism for inter-task synchronization and inter-task communication, for example, by using hardware resources such as the processor 10, the execution memory 11, and the nonvolatile memory 13.

In addition, the OS 100 has a function of protecting hardware resources temporally and spatially in order to increase the independence of the safety monitoring application 101 and the safety control application 103, which are related to ensuring of functional safety, from the normal control application 102. Here, the hardware resources include the processor 10, the execution memory 11, and the I/O port 12.

Out of these, temporal protection is performed by partitioning a temporal resource such as an execution time of the processor 10. Specifically, the temporal protection is performed by partitioning the execution time of the processor 10 and allocating a task (a process or a thread) to each partition (referred to as "time partition"). A scheduling function (partition scheduler 21) of the OS 100 provides a guarantee of use of resources, including the execution time of the processor 10, to the task allocated to each time partition (hereinafter, abbreviated as "TP" in some cases).

Figure 2:
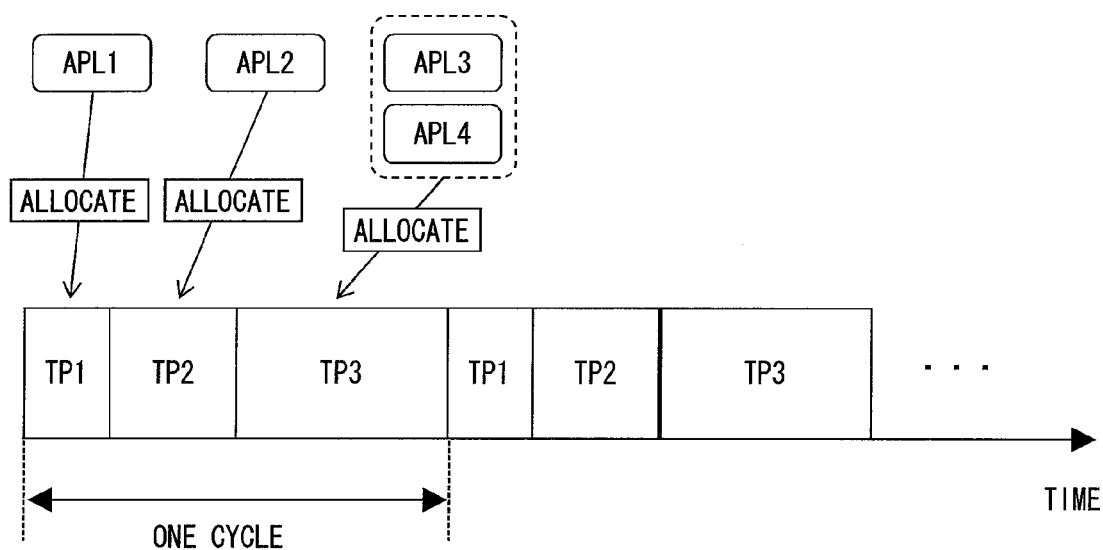
FIG. 2 is a diagram for explaining the concept of time partitioning in the first embodiment of the invention.

FIG. 2 is a conceptual diagram relating to the time partitioning. FIG. 2 shows an example in which a predetermined one-cycle time is divided into three time partitions of TP1, TP2, and TP3. Assuming that the one-cycle time is 100 ticks, the first 20 ticks are defined as TP1, the middle 30 ticks are defined as TP2, and the last 50 ticks are defined as TP3.

In the example shown in FIG. 2, a first application (APL1) to a fourth application (APL4) are allocated to any of TP1 to TP3. The scheduling function (partition scheduler 21) of the OS 100 selects and decides one of TP1 to TP3 to be activated according to a lapse of time. Then, the application allocated to the active TP is executed by the processor 10.

Meanwhile, spatial protection is performed by partitioning stationary resources, including the execution memory 11 and the I/O port 12, and by allocating a task to each partition (referred to as "resource partition"). The scheduling function (partition scheduler 21) of the OS 100 inhibits the task from exceeding the resource partition preliminarily allocated (hereinafter, abbreviated as "RP" in some cases) and from accessing other resources.

Figure 3:
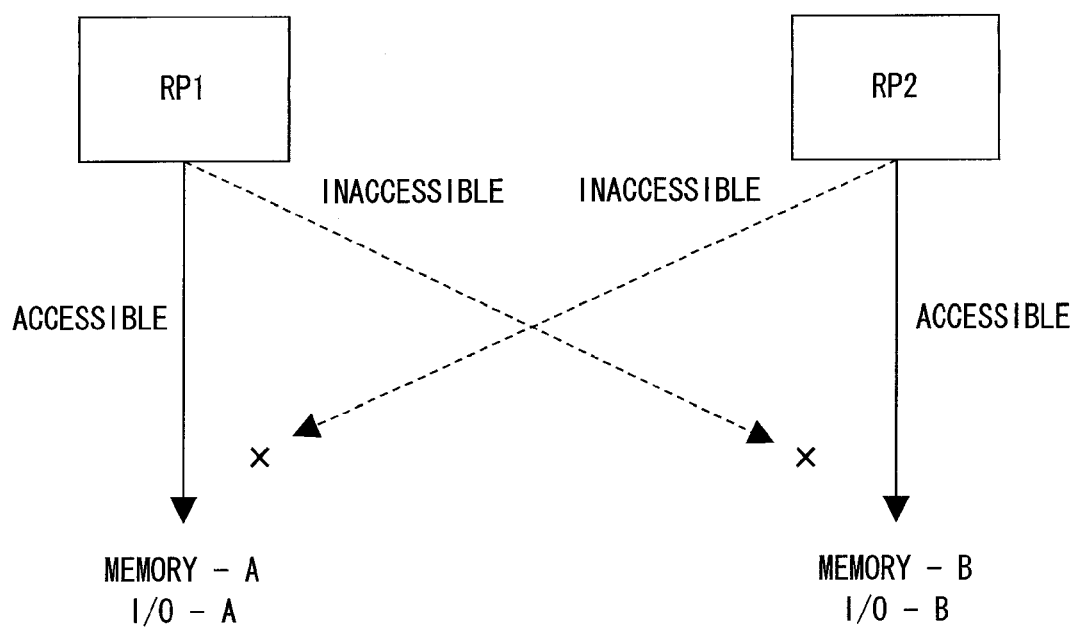
FIG. 3 is a conceptual diagram for explaining the concept of resource partitioning in the first embodiment of the invention.

FIG. 3 is a conceptual diagram relating to the resource partitioning. The example of FIG. 3 shows two RPs (RP1 and RP2). A part (A area) of each of the execution memory 11 and the nonvolatile memory 13 and a part (port A) of the I/O port 12 are allocated to RP1. Further, another part (B area) of each of the execution memory 11 and the nonvolatile memory 13 and another part (port B) of the I/O port 12 are allocated to RP2. Access from RP1 to the resources allocated to RP2 is inhibited, and access from RP2 to the resources allocated to RP1 is inhibited.

Note that there is no need to exclusively allocate all the resources to any one of RPs. That is, the resources may be shared by a plurality of RPs. For example, in the case of performing safety control of a service robot, it is necessary for the actuator to be accessible from both the normal control application 101 and the safety control application 102. Accordingly, the I/O port for controlling the actuator may be shared by the RP to which the normal control application 101 belongs and the RP to which the safety control application 102 belongs.

Returning to FIG. 1, description will be continued. The applications 101 to 103 are executed in the multiprogramming environment provided by the OS 100 and the processor 10. Among these applications, the safety monitoring application 101 includes instruction code for causing the processor 10 to execute monitoring of the running status of the normal control application 102, monitoring of the running status of the safety control application 103, and monitoring of the input and output data to and from the I/O port 12. The safety monitoring application 101 also includes instruction code for causing the processor 10 to execute notification of a result to the partition scheduler 21. That is, the safety monitoring application 101 is a safety-related application.

Further, the normal control application 102 includes instruction code for causing the processor 10 to execute a control procedure to cause a control target, such as a service robot, to execute a normal function/operation. The normal control application 102 also includes instruction code for causing the processor 10 to execute notification of the result to the partition scheduler 21. That is, the normal control application 102 is a non-safety-related application.

Furthermore, the safety control application 103 includes instruction code for causing the processor 10 to execute a control procedure prescribed to ensure functional safety in a case where some abnormality is detected. The safety control application 103 also includes instruction code for causing the processor 10 to execute notification of the result to the partition scheduler 21. That is, the safety control application 103 is a safety-related application.

A reset circuit 14 resets a microcontroller 15 based on a signal from the OS 100. The mechanism for resetting the microcontroller 15 using the reset circuit 14 will be described later.

Figure 4:
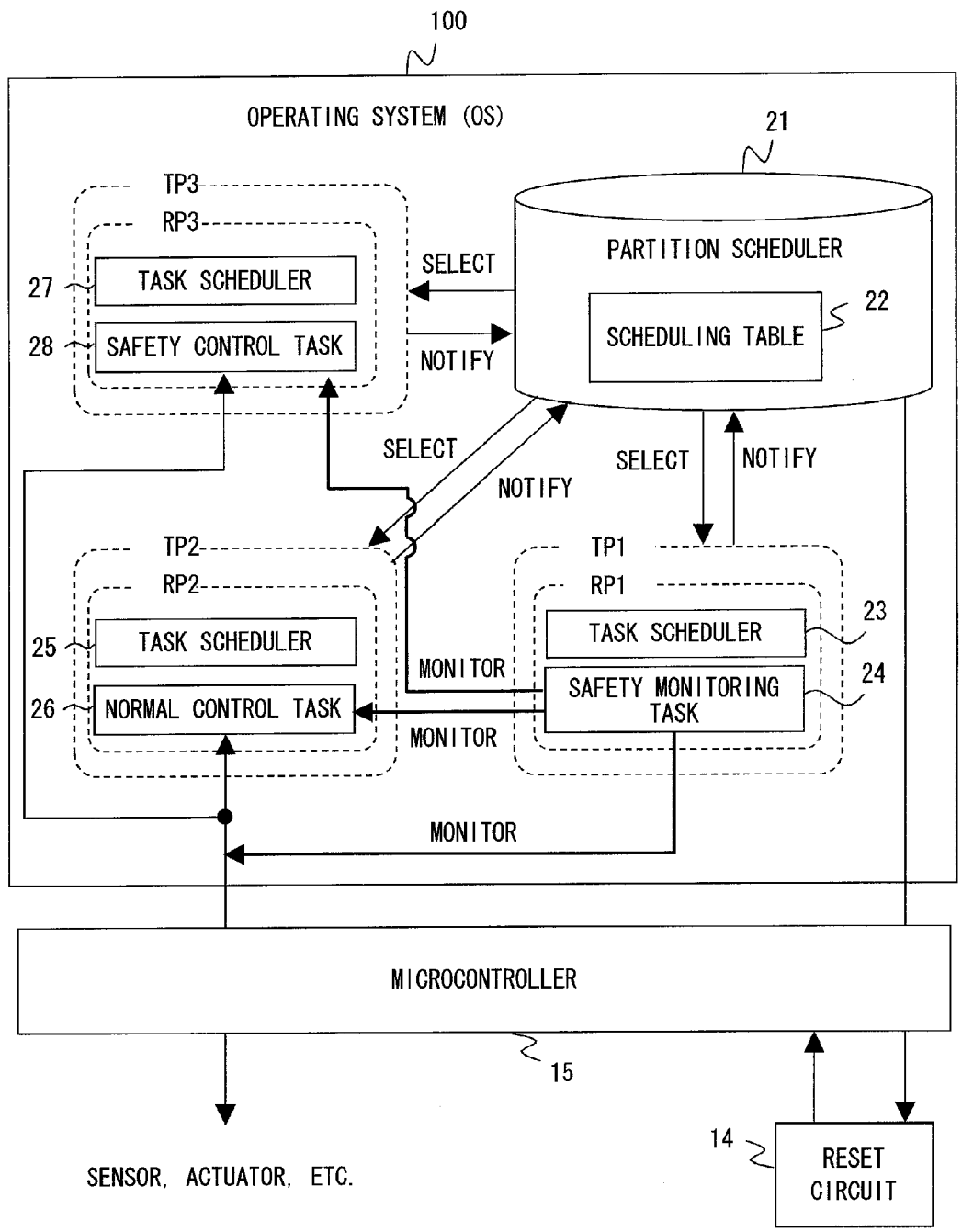
FIG. 4 is a diagram showing relationships between a partition scheduler and tasks which are activated in an execution environment provided by an OS shown in FIG. 1.

Subsequently, relationships between the partition scheduler 21 and tasks generated upon activation of the applications 101 to 103 will be described with reference to FIG. 4. FIG. 4 is a diagram showing the relationships between the partition scheduler 21 and tasks 24, 26, and 28 which are activated in the multiprogramming environment provided by the OS 100.

The microcontroller 15 includes the processor 10, the execution memory 11, the I/O port 12, and the nonvolatile memory 13. While FIG. 4 illustrates a configuration in which the reset circuit 14 is provided outside the microcontroller 15, a configuration in which the reset circuit 14 is included in the microcontroller 15 may also be employed.

The microcontroller 15 is supplied with a clock signal from an external clock source, and the processor 10 and the like operate in a predetermined timer period based on the clock signal. This embodiment is described assuming that the predetermined timer period is one tick. Accordingly, when the OS 100 is executed by the processor 10, the partition scheduler 21 operates every one tick. In the TPs, task schedulers 23, 25, and 27 and the tasks (the safety monitoring task 24, the normal control task 26, and the safety control task 28) operate every one tick.

The partition scheduler 21 operates every one tick and switches the TP (partition scheduling). The partition scheduler 21 selects and decides one of TP1 to TP3 to be activated in the next one tick. Further, the partition scheduler 21 starts operation of the task scheduler on the selected TP.

Specifically, the partition scheduling is performed by the partition scheduler 21 in such a manner that the partition scheduler 21 refers to a scheduling table 22 to perform the partition scheduling in accordance with a scheduling pattern defining a setting of each TP.

The scheduling table 22 retains scheduling patterns each defining a switching order and a timing of each TP. Note that the scheduling table 22 holds at least two different scheduling patterns. One is a scheduling pattern applied when abnormality detection is not performed by the safety monitoring task 24 (i.e., during normal time). The other is a scheduling pattern applied when an abnormality is detected by the safety monitoring task 24. Hereinafter, the scheduling pattern applied during normal time is called a "normal control scheduling pattern", and the scheduling pattern applied upon detection of an abnormality is called a "safety control scheduling pattern".

Figure 5A:
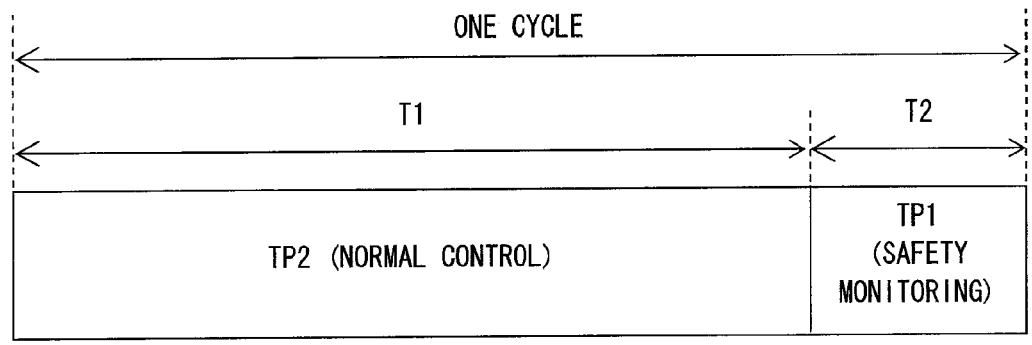
FIG. 5A is a diagram showing a specific example of a scheduling pattern.

FIG. 5A shows a specific example of the normal control scheduling pattern. In FIG. 5A, TP2 to which the normal control task 26 belongs is allocated to the first half (T1) of the one-cycle time. Further, TP1 to which the safety monitoring task 24 belongs is allocated to the latter half (T2) of the one-cycle time. According to the scheduling pattern shown in FIG. 5A, the normal control task 26 and the safety monitoring task 24 are repeatedly scheduled.

Figure 5B:
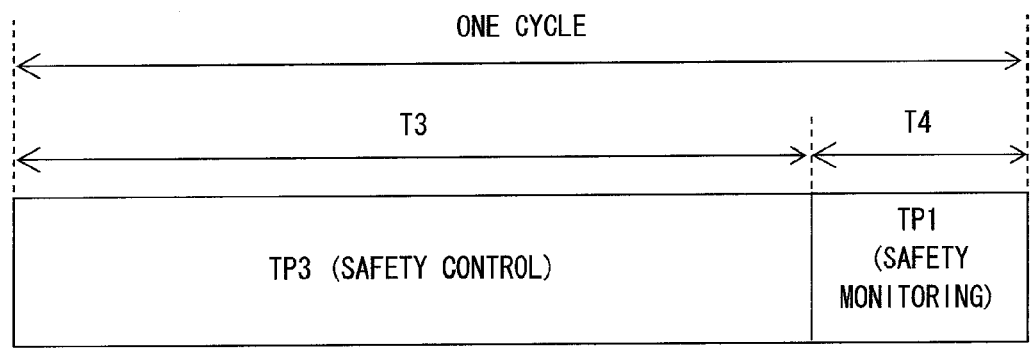
FIG. 5B is a diagram showing a specific example of the scheduling pattern.

FIG. 5B shows a specific example of the safety control scheduling pattern. In FIG. 5B, TP3 to which the safety control task 28 belongs is allocated to the first half (T3) of the one-cycle time. Further, TP1 to which the safety monitoring task 24 belongs is allocated to the latter half (T4) of the one-cycle time. According to the scheduling pattern shown in FIG. 5B, the safety control task 28 and the safety monitoring task 24 are repeatedly scheduled.

Returning to FIG. 4, the description will be continued. The task schedulers 23, 25, and 27 schedule the tasks in the TPs to which the task schedulers respectively belong. Typical scheduling based on priorities may be applied to the scheduling of the tasks in the TPs. Note that FIG. 4 illustrates that each TP includes only one task, but in practice, each TP includes one or more tasks. For example, TP2 for normal control may include two tasks: a normal control task A and a normal control task B.

The safety monitoring task 24 is a task generated upon activation of the safety monitoring application 101. In the example shown in FIG. 4, the safety monitoring task 24 is allocated to TP1 and RP1. The safety monitoring task 24 monitors the running status of the normal control task 26, which is a non-safety-related application, monitors the running status of the safety control task 28, which is a safety-related application, and monitors the input and output data to and from the I/O port 12. Furthermore, the safety monitoring task 24 notifies the partition scheduler 21 of the running status of the task.

The normal control task 26 is a task generated upon activation of the normal control application 102. In the example shown in FIG. 4, the normal control task 26 is allocated to TP2 and RP2. The normal control task 26 performs a control for causing a control target, such as a service robot, to execute a normal function/operation. Furthermore, the normal control task 26 notifies the partition scheduler 21 of the running status of the task.

The safety control task 28 is a task generated upon activation of the safety control application 103. In the example shown in FIG. 4, the safety control task 28 is allocated to TP3 and RP3. The safety control task 28 performs a control prescribed to ensure functional safety in a case where some abnormality is detected. Furthermore, the safety control task 28 notifies the partition scheduler 21 of the running status of the task. Note that various techniques may be employed as a specific configuration for notifying the results from each task to the partition 21. For example, a task may invoke a system call (service call) of the OS 100, and results may be notified to the partition scheduler 21 through the OS 100. Alternatively, assuming that a flag related to the running status of a task is stored in the execution memory 11, the task may set the value of the flag according to the running status of the task, and the partition scheduler 21 may judge the running status of the task according to the set value of the flag.

As described above, the partition scheduler 21 operates every one tick to select and decide one of TP1 to TP3 to be activated. Further, the partition scheduler 21 starts operation of the task scheduler on the selected TP. Then, when the task schedulers 23, 25, and 27 start operation, the task scheduling is carried out, and the processor 10 executes the tasks in the TP in the order of the tasks scheduled by the task schedulers 23, 25, and 27. Thus, the application allocated to the active TP is executed by the processor 10.

Figure 6:
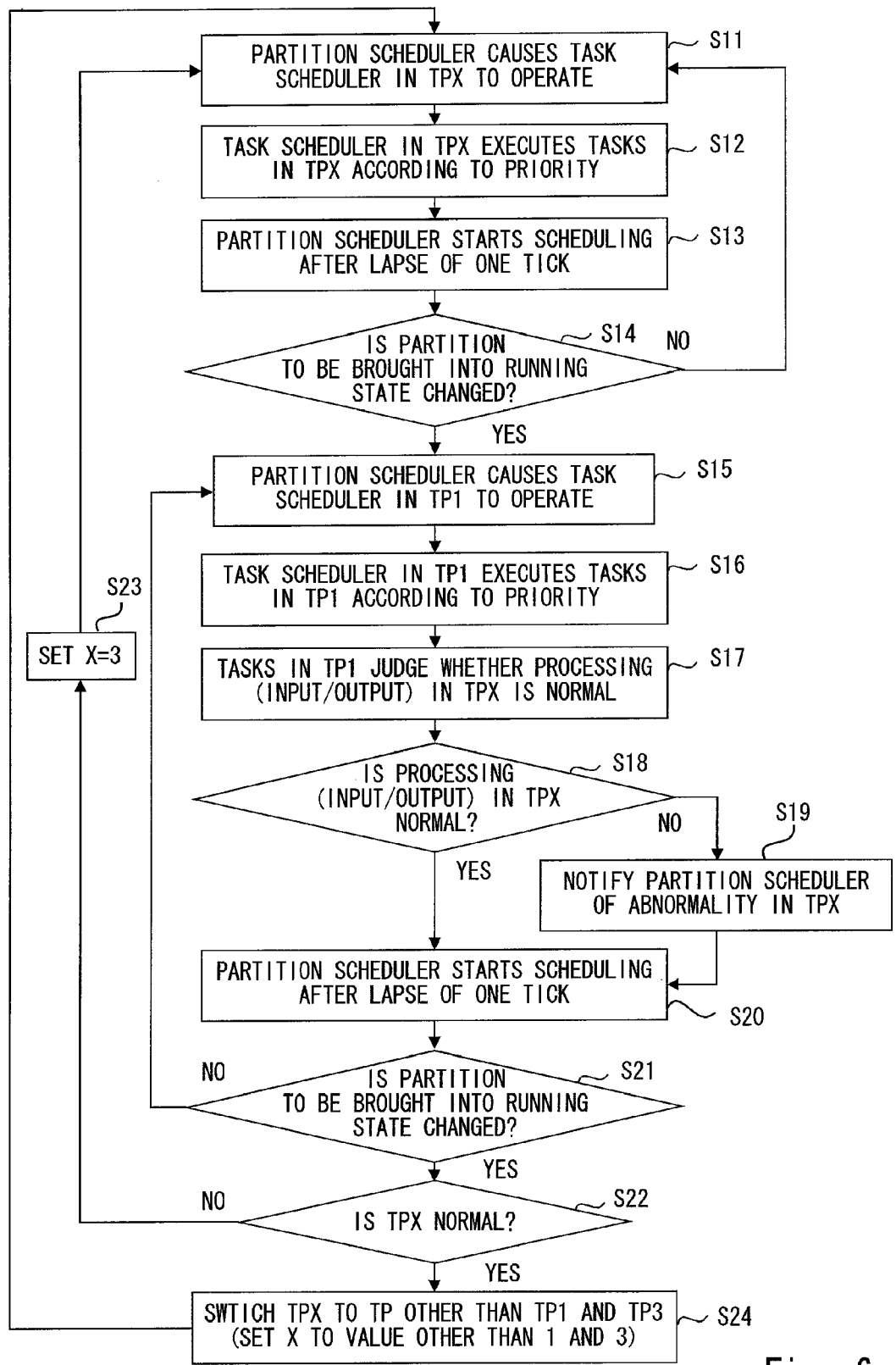
FIG. 6 is a flowchart showing a specific example of a procedure of the partition scheduler.

Subsequently, the partition scheduling performed by the partition scheduler 21 will be described with reference to FIG. 6. FIG. 6 is a flowchart showing a specific example of the procedure of the partition scheduler 21. Referring to FIG. 6, a case is described by way of example in which the scheduling is executed in accordance with the normal control scheduling pattern (for example, FIG. 5A) or the safety control scheduling pattern (for example, FIG. 5B). In other words, a case is described by way of example in which when TP1 is a TP subsequent to TP2 or TP3 and when an abnormality of TP2 is detected in TP1, TP3 is a TP subsequently selected and decided upon reception of the result from TP1.

First, the partitioning scheduler 21, which operates every one tick, causes the task scheduler in TPX to operate (S11). Here, a variable X represents a TP number, and X is a value other than 1. Specifically, in S11, one of TP2 and TP3, excluding TP1 for safety monitoring, is caused to operate.

The task scheduler in TPX having started operation in S11 executes tasks in TPX according to priority (S12). After a lapse of one tick, the partition scheduler 21 starts scheduling of TPs (S13). Specifically, the partition scheduler 21 selects and decides one of TPs to be activated in the next one tick in accordance with the scheduling pattern.

When the TP to be subsequently activated is not changed (No in S14), the partition scheduler 21 returns to S11 to continue operation on the same TPX. Accordingly, before the timing when TPX is switched, the processing of S11 to S14 is repeated.

When the TP to be subsequently activated is changed (Yes in S14), the partition scheduler 21 causes the task scheduler in the time partition to be changed to operate (S15). Here, the task scheduler in TP1 is caused to operate. Then, the task scheduler 23 in TP1 executes the tasks in TP1 according to priority (S16).

The safety monitoring task 24 executed in TP1 monitors the running status of the normal control task 26 and monitors the input and output data to and from the I/O port 12, to thereby judge whether these are normal (S17). As a result of the judgment, when it is judged that they are abnormal (No in S18), the safety monitoring task 24 notifies the partition scheduler 21 of the result (S19).

After a lapse of one tick, the partition scheduler 21 resumes scheduling (S20). The partition scheduler 21 selects and decides which TP is to be activated in the next one tick in accordance with the scheduling pattern. When the TP to be subsequently activated is not changed (No in S21), the flow returns to S15 to continue the operation on TP1.

When the TP to be subsequently activated is changed (Yes in S21), the partition scheduler 21 further judges whether TPX has been normal according to the result notified from TP1 in S19 (S22). As a result of the judgment, when it has been abnormal (No in S22), the partition scheduler 21 selects and decides TP3 as the TP to be activated in the next one tick (S23).

As a result of the judgment, when it has been normal (Yes in S22), the partition scheduler 21 selects and decides TPX other than TP1 and TP3 as the TP to be activated in the next one tick (S24).

As for the processing shown in FIG. 6, a specific example of the partition scheduling will be described.

First, a case will be described in which scheduling is started in S11 in accordance with the normal control scheduling pattern illustrated in FIG. 5A. In this case, the scheduling is started in S11 assuming that TPX=TP2 holds, and TPX=TP2 is maintained during the processing of S12 to S14. Then, TPX is changed from TP2 to TP1 in S15, and TP1 remains unchanged during the processing of S15 to S21. When it is determined that the running status (data input and output) related to TP2 is normal in S18, TPX=TP2 holds in S24 (that is, the normal control scheduling pattern starting from TP2 is continued). Meanwhile, when it is determined that the running status (data input and output) related to TP2 is abnormal in S18, TPX=TP3 holds in S23 (that is, the scheduling pattern is switched to the safety control scheduling pattern starting from TP3).

Further, a case will be described in which scheduling is started in S11 in accordance with the safety control scheduling pattern illustrated in FIG. 5B. In this case, the scheduling is started assuming that TPX=TP3 holds in S11, and TPX=TP3 is maintained during the processing of S12 to S14. Then, TPX is changed from TP3 to TP1 in S15, and TP1 remains unchanged during the processing of S15 to S21. When it is determined that the running status (data input and output) related to TP3 is normal in S18, TPX=TP2 holds (that is, the scheduling pattern is switched to the normal control scheduling pattern starting from TP2) in S24. Meanwhile, when it is determined that the running status (data input and output) related to TP3 is abnormal in S18, TPX=TP3 holds (that is, the safety control scheduling pattern starting from TP3 is continued) in S23.

The above example illustrates the case where only the three TPs (TP1 for safety monitoring, TP2 for normal control, and TP3 for safety control) are combined as the scheduling pattern, but a plurality of partitions TP2 for normal control and a plurality of partitions TP3 for safety control may be present. For example, scheduling patterns may be formed by a combination of five TPs (TP1 to TP5) including two TPs of TP2 and TP4 for normal control, TP1 for safety monitoring, and two TPs of TP3 and TP5 for safety control. In this case, in S23, the partition scheduler 21 may determine the type of the abnormality state of the running status (data input and output) related to TPX, and may select one of TP3 and TP5 for safety control according to the abnormality type. Further, in S24, one of TP2 and TP4 for normal control may be selected.

As described above, in this embodiment, the OS 100 includes the partition scheduler 21 for selecting and deciding a partition to be subsequently activated in response to the notification from TP1 for safety monitoring or the notification from each TP. The partition scheduler 21 operates in the predetermined timer period independently from the tasks executed in each TP. The partition scheduler 21 which operates independently in the predetermined timer period includes a partition scheduling function, which provides the following effects.

First, in general, there is a demand for shortening the execution time of the safety monitoring task 24 as much as possible in order to sufficiently ensure the execution time of the normal control task 26. In a related art (for example, Patent Literature 1), the safety monitoring task 24 performs not only monitoring of the running status of the normal control task 26 and monitoring of the input and output data to and from the I/O port 12, but also selection and decision of the scheduling pattern. Therefore, it is necessary to allocate the execution time required for the selection and decision to TP2 to which the safety monitoring task 24 belongs.

In order to guarantee the ensuring of functional safety, it is basically necessary to alternately execute the safety monitoring task 24 and the normal control task 26. For this reason, in the related art, the selection and decision of the scheduling pattern by the safety monitoring task 24 are also executed each time upon execution of the normal control task 26. After a plurality of cycles in total, a lot of execution time is required for the safety monitoring task 24 to select and decide the scheduling pattern.

On the other hand, according to this embodiment, it is not necessary for the safety monitoring task 24 itself to execute selection and decision of the scheduling pattern. Additionally, the execution time required for the partition scheduler 21 to select and decide the scheduling pattern is shortened. This provides an effect that a shorter period of time can be allocated to TP1 for safety monitoring and a longer period of time can be allocated to TP2 for normal control, as compared with the related art.

Furthermore, the processing illustrated in FIG. 6 has been described assuming that the partition scheduler 21 selects and decides TP3 for safety control (S23), or selects and decides TP2 for normal control (S24), according to the result notified from TP1, but the present invention is not limited thereto. For example, a configuration in which the result of the running status is notified to the partition scheduler 21 from each of TP1 to TP3 may be employed in place of the configuration in which the result is notified to the partition scheduler 21 only from TP1 for safety monitoring, and the partition scheduler 21 may select and decide TP3 for safety control according to the result notified from each TP.

When the partition scheduler 21 which operates independently from each TP employs a configuration for receiving the results notified from all TPs, the partition scheduler 21 can grasp the statuses related to all TPs in an integrated manner. Accordingly, for example, the partition scheduler 21 can execute judgment as to skipping or the like of the TP which need not be executed, in consideration of the status of each TP based on the result notified from each TP. This provides an effect that only the time partition which need not be executed can be intentionally skipped. Furthermore, for example, the partition scheduler 21 can decide and select the next partition only from TPs in the normal state in consideration of the status of each TP based on the result notified from TP1 for safety monitoring. Therefore, unlike the related art, the effect of achieving more accurate partition scheduling can be obtained.

Figure 7:
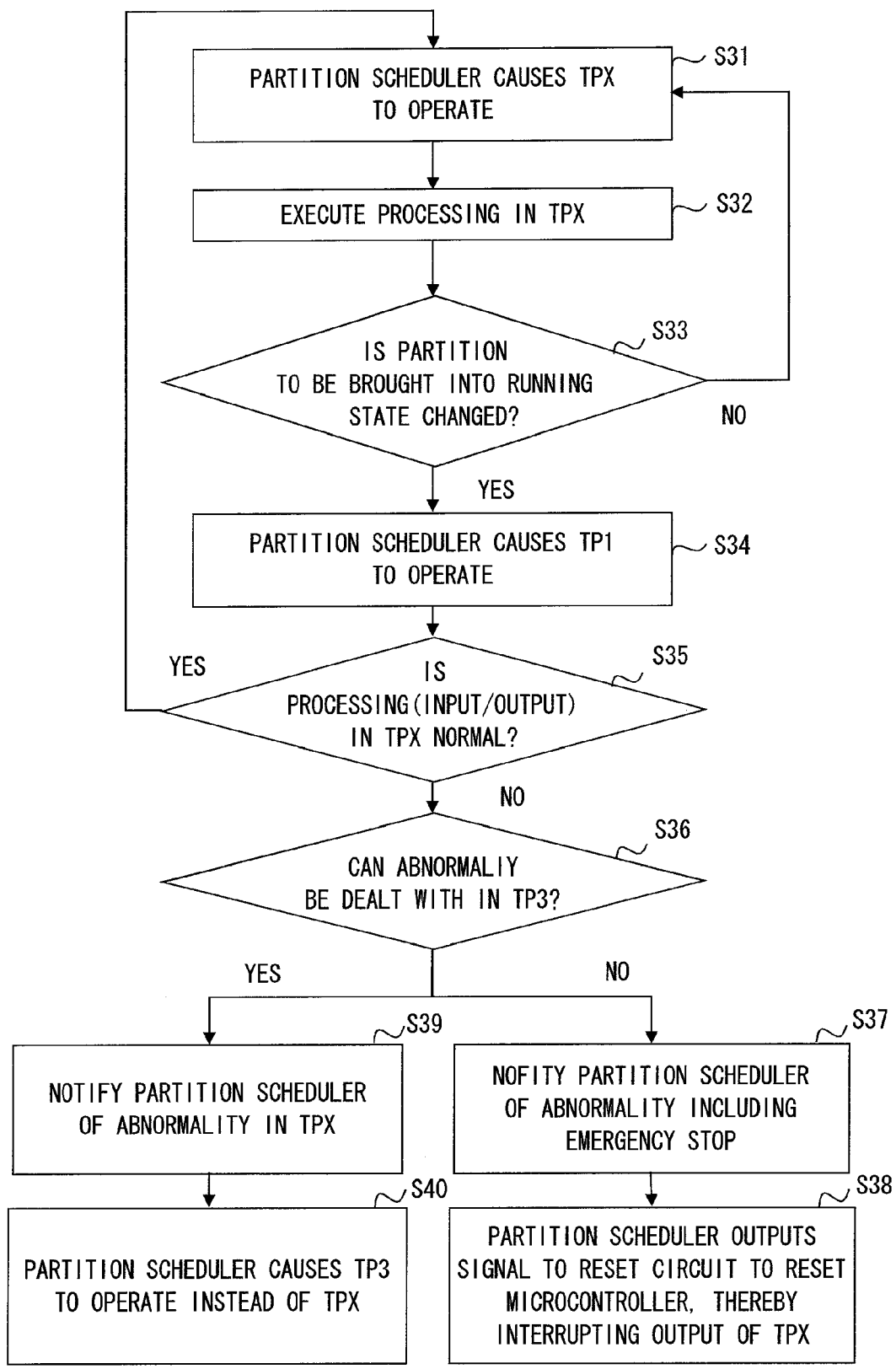
FIG. 7 is a flowchart showing a specific example of a reset procedure of a microcontroller.
Figure 8:
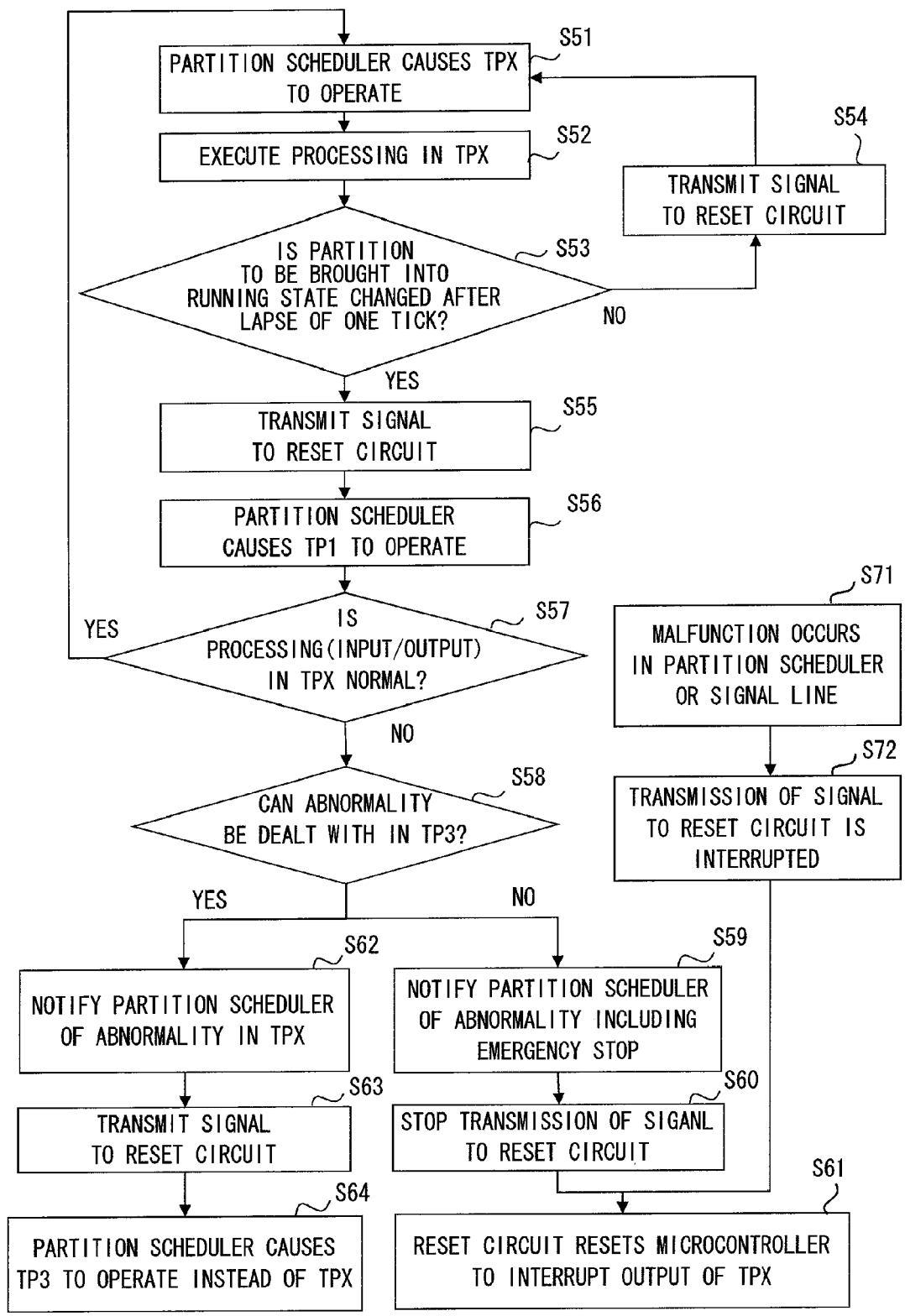
FIG. 8 is a flowchart showing a specific example of the reset procedure of the microcontroller.

Subsequently, the mechanism for resetting the microcontroller 15 using the reset circuit 14 will be described with reference to FIGS. 7 and 8. FIGS. 7 and 8 are flowcharts each showing a specific example of the reset procedure of the microcontroller 15 using the reset circuit 14.

In this embodiment, the partition scheduler 21 which operates every one tick has a function of resetting the microcontroller 15. Upon detecting an abnormality in the OS 100, the partition scheduler 21 takes a measure for the abnormality in conjunction with the reset circuit 14. The reset circuit 14 resets the microcontroller 15 based on the signal from the partition scheduler 21.

Referring first to FIG. 7, a specific example of the reset procedure of the microcontroller 15 using the reset circuit 14 will be described. In the processing shown in FIG. 7, upon receiving a reset instruction signal from the partition scheduler 21, the reset circuit 14 resets the microcontroller 15. Note that in FIG. 7, TPX is a TP other than TP1 and TP3.

First, in S31 to S33, the partition scheduler 21 starts operation of TPX, thereby executing processing related to TPX until the TP to be subsequently activated is changed. After the partition scheduler 21 starts operation of the task scheduler 23 in TP1 (S34), the safety monitoring task 24 belonging to TP1 judges whether the processing (input and output) related to TPX has been normal (S35). As a result of the judgment, when the processing has been normal (Yes in S35), the flow returns to S31 to continue the operation for the same TPX.

As a result of the judgment, when the processing has been abnormal (No in S35), the safety monitoring task 24 belonging to TP1 judges whether the abnormality in TPX is an abnormality that can be dealt with by the safety control task 28 belonging to TP3 (S36). When the abnormality is not an abnormality that can be dealt with in TP3 (No in S36), the safety monitoring task 24 belonging to TP1 notifies the partition scheduler 21 of an abnormality including an emergency stop (S37). The partition scheduler 21 having received the notification from the safety monitoring task 24 belonging to TP1 outputs a reset instruction signal to the reset circuit 14, and the reset circuit 14 having received the reset instruction signal resets the microcontroller 15 (S38).

When the abnormality is an abnormality that can be dealt with in TP3 (Yes in S36), the safety monitoring task 24 belonging to TP1 notifies the partition scheduler 21 of the abnormality in TPX (S39). The partition scheduler 21 having received the notification from TP1 switches the time partition from TPX to TP3 (S40).

Referring next to FIG. 8, another specific example of the reset procedure of the microcontroller 15 using the reset circuit 14 will be described. In the processing shown in FIG. 8, the partition scheduler 21 periodically transmits signals to the reset circuit 14. Further, when the transmission of signals from the partition scheduler 21 is interrupted, the reset circuit 14 resets the microcontroller 15. Note that in FIG. 8, TPX is a TP other than TP1 and TP3.

In comparison with the processing of S31 to S35 shown in FIG. 7, it is clarified in S53 of FIG. 8 that the partition scheduler 21 operates every one tick, and there is a difference in that the partition scheduler 21 periodically transmits signals to the reset circuit 14 in S54 and S55. The other processing of S51 to S57 shown in FIG. 8 is basically the same as that of S31 to S35 shown in FIG. 7.

Further, in comparison with the processing of S36 to S40 shown in FIG. 7, there is a difference in that the partition scheduler 21 suspends transmission of signals to the reset circuit 14 in S60 of FIG. 8, and that the partition scheduler 21 transmits signals to the reset circuit 14 in S63. There is another difference in that, in S61 of FIG. 8, the reset circuit 14 resets the microcontroller 15 upon interruption of the transmission of signals from the partition scheduler 21. The other processing of S58 to S64 shown in FIG. 8 is basically the same as that of S36 to S40 shown in FIG. 7.

Moreover, as shown in S71 and S72 of FIG. 8, when a malfunction occurs in the partition scheduler 21, or when a malfunction occurs in a signal line from the partition scheduler 21 to the reset circuit 14, in parallel with the processing of S51 to S64, the transmission of signals from the partition scheduler 21 to the reset circuit 14 is interrupted. Also in this case, the reset circuit 14 resets the microcontroller 15 upon interruption of the transmission of signals from the partition scheduler 21 (S61).

According to the processing shown in FIG. 8, the microcontroller 15 can be reliably reset not only when the reset instruction is intentionally issued from the partition scheduler 21 to the reset circuit 14, but also when the partition scheduler 21 itself fails to operate normally due to some causes or when a malfunction occurs in a signal line for transmitting signals from the partition scheduler 21 to the reset circuit 14. At the same time, execution of normal switching of TPs every one tick can also be guaranteed.

Note that in FIGS. 7 and 8, the description has been made assuming that the partition scheduler 21 outputs the reset instruction signal to the reset circuit 14 or suspends transmission of the signal to the reset circuit 14 in response to the notification of the result from TP1. Alternatively, the partition scheduler 21 may output the reset instruction signal to the reset circuit 14 or stop transmission of the signal to the reset circuit 14 in response to the notification of the result from any one of TP1 to TP3.

Second Embodiment of the Invention

A safety controller according to this embodiment is a modification of the safety controller 1 described above. The overall configuration of the safety controller according to this embodiment may be similar to the configuration of the safety controller 1 shown in FIG. 1. Additionally, a task execution environment provided by an OS included in the safety controller according to this embodiment may be configured in the same manner as that of the task execution environment shown in FIG. 4.

Figure 9:
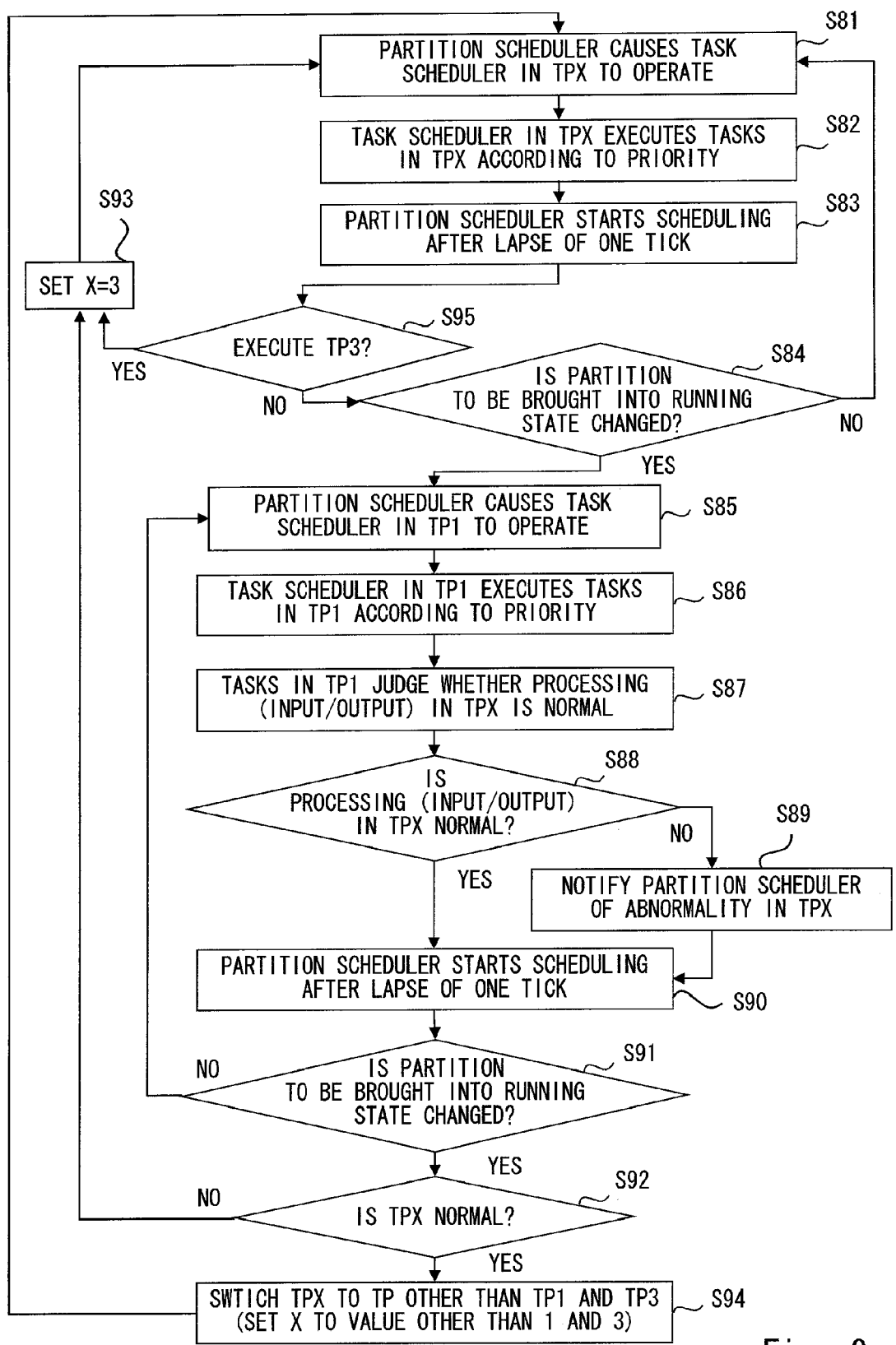
FIG. 9 is a flowchart showing a specific example of a procedure of a partition scheduler.
Figure 11A:
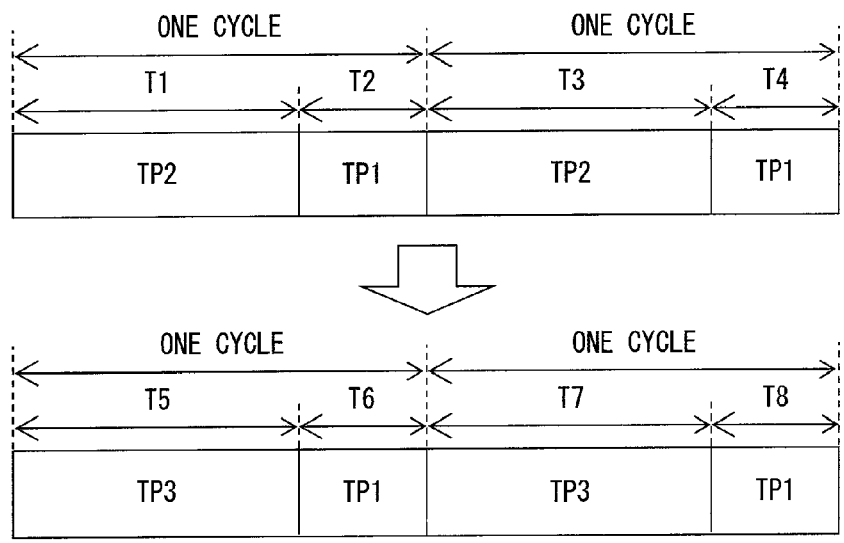
FIG. 11A is a diagram for explaining a problem to be solved by the present invention.
Figure 11B:
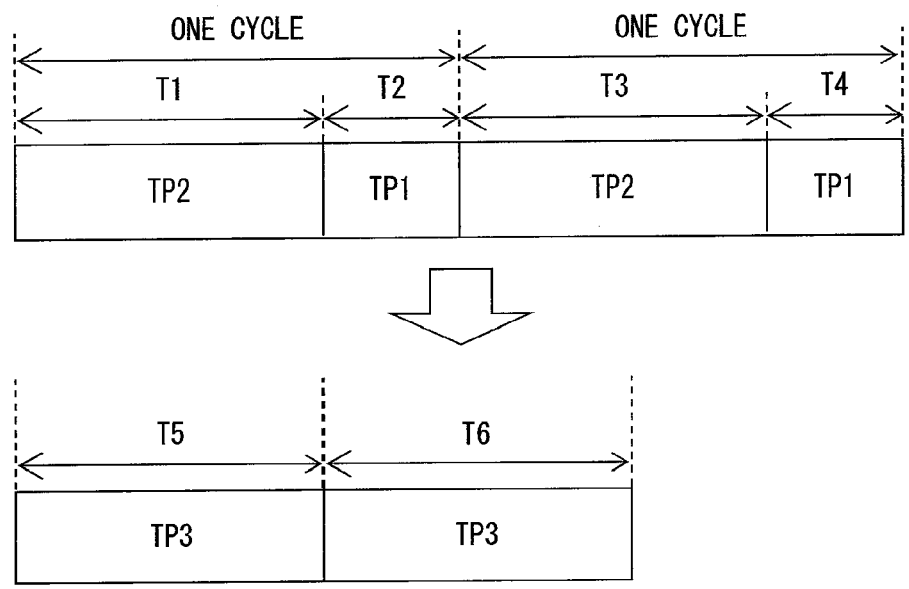
FIG. 11B is a diagram for explaining an advantageous effect of the present invention.
Figure 12:
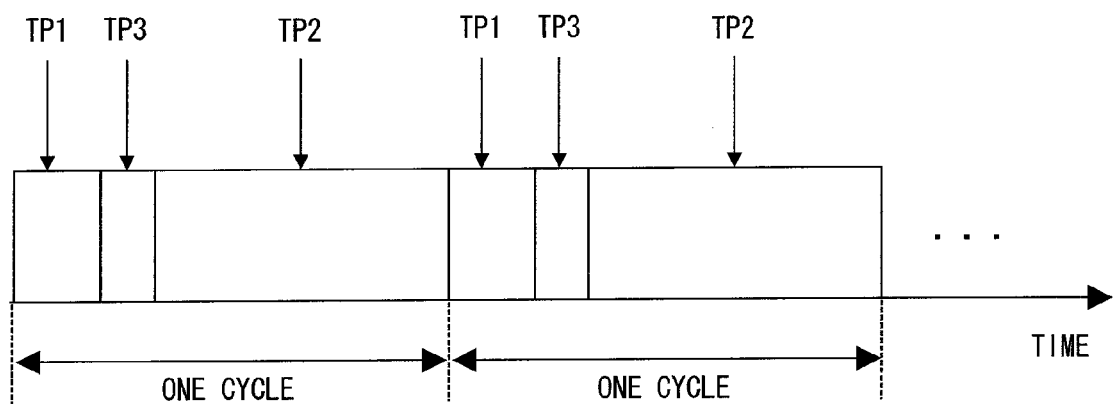
FIG. 12 is a diagram for explaining a problem to be solved by the present invention.
Figure 13:
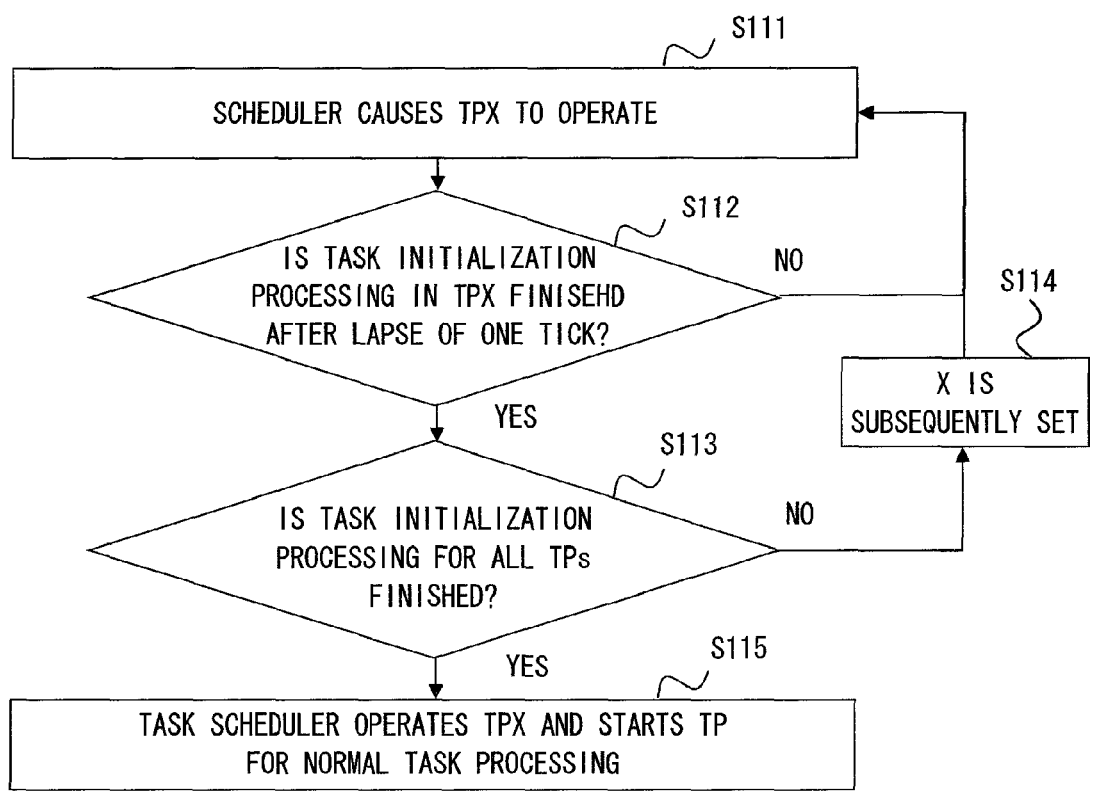
FIG. 13 is a diagram for explaining a problem to be solved by the present invention.

Referring next to FIGS. 9 and 11B, the processing of the safety controller 1 according to this embodiment will be described in further detail. FIG. 9 is a flowchart showing a specific example of the procedure of the partition scheduler 21 according to this embodiment. Note that in the following description, description of processing contents identical with those described in FIG. 6 is simplified, and different processing contents will be described in more detail.

First, the partition scheduler 21 that operates every one tick causes the task scheduler in TPX to operate (S81). Here, a variable X represents a TP number, and X is a value other than 1. Note that the processing contents of S81 to S83 in FIG. 9 are identical with those of S11 to S13 in FIG. 6, so the detailed description thereof is herein omitted.

Referring to FIG. 9, a case is described by way of example in which the scheduling pattern is switched to the safety control scheduling pattern (for example, FIG. 5B) when scheduling is started in accordance with the normal control scheduling pattern (for example, FIG. 5A). In other words, a case is described by way of example in which when TP1 is a TP subsequent to TP2 and when an abnormality of TP2 is detected in TP1, TP3 is a TP to be subsequently selected and decided upon reception of the result from TP1.

The partition scheduler 21 judges whether the task in TP3 is currently executed (S95). When the task in TP3 is not being executed (No in S95) and when the partition scheduler 21 does not change the TP to be subsequently activated (No in S84), the flow returns to S81 to continue the operation for the same TPX. Note that the processing contents of S85 to S93 in FIG. 9 are the same as those of S15 to S23 in FIG. 6, so the detailed description thereof is herein omitted.

As for the processing shown in FIG. 9, a specific example of partition scheduling will be described.

Here, a case is described in which scheduling is started in S81 in accordance with the normal control scheduling pattern illustrated in FIG. 5A. In this case, the scheduling is started in S81 assuming that TPX=TP2 holds, and TPX=TP2 is maintained also in the processing of S82 to S84 until TPX=TP3 is satisfied after passing through S93. Further, TPX is changed from TP2 to TP1 in S85, and TP1 remains unchanged during the processing of S85 to S91. When it is determined that the running status (data input and output) related to TP2 is normal in S85, TPX=TP2 holds in S94 (that is, the normal control scheduling pattern starting from TP2 is continued). Meanwhile, when it is determined that the running status (data input and output) related to TP2 is abnormal in S88, TPX=TP3 holds in S93 (that is, the scheduling pattern is switched to the safety control scheduling pattern starting from TP3). Furthermore, when TPX=TP3 holds in S93, the partition scheduler 21 maintains TPX=TP3 in S95 and S93. That is, the partition scheduler 21 executes the partition scheduling so as to continuously select and decide TP3.

Note that in the example shown in FIG. 9, processing for switching from TP3 to TP2 as a result of ensuring the safety by the safety control after TP 3 is continuously selected and decided as TPX is not particularly illustrated. However, in order to implement this processing, a configuration for determining switching to TP2 depending on the contents of the notified result in TP3 may be employed as a configuration in which the partition scheduler 21 receives the result notified from the task in TP3, for example.

Note that the example of FIG. 9 illustrates the case where only the three TPs (TP1 for safety monitoring, TP2 for normal control, and TP3 for safety control) are combined as the scheduling pattern, but a plurality of partitions TP2 for normal control and a plurality of partitions TP3 for safety control may be present. For example, scheduling patterns may be formed by a combination of five TPs (TP1 to TP5) including two TPs of TP2 and TP4 for normal control, TP1 for safety monitoring, and two TPs of TP3 and TP5 for safety control. In this case, in S95, the partition scheduler 21 may determine whether any one of tasks in TP3 or TP5 is currently executed, and in S83, the partition scheduler 21 may determine the type of the abnormality state of the running status (data input and output) related to TPX, and may select one of TP3 and TP5 for safety control according to the type.

According to this embodiment described above, when an abnormality occurs, TPs for executing tasks other than the tasks for safety control can be skipped, and only the tasks in TP3 can be executed in the subsequent scheduling. As a result, if an abnormality occurs when the scheduling is performed in accordance with the scheduling pattern during the normal control as shown in the upper part of FIG. 11B, for example, the scheduling pattern can be switched to the scheduling pattern shown in the lower part of FIG. 11B, and only TP3 can be executed immediately and continuously. This makes it possible to start processing using a safety control program more rapidly.

Further, when a configuration is employed in which the partition scheduler 21 receives results notified from each TP and switches TPs in consideration of the statuses of all TPs, the time partition can be switched to TP3 for safety control and TP3 can be maintained until the safety is ensured, regardless of the predetermined scheduling pattern. Moreover, it is judged whether the safety has been ensured by executing TP3, based on the result notified from TP3, thereby enabling switching of the time partition to TP2 (restoring the pattern during the normal control). Accordingly, the safety control can be appropriately performed upon occurrence of an abnormality.

Third Embodiment of the Invention

A safety controller according to this embodiment is a modification of the safety controller 1 described above. The overall configuration of the safety controller according to this embodiment may be similar to the configuration of the safety controller 1 shown in FIG. 1. Additionally, a task execution environment provided by an OS included in the safety controller according to this embodiment may be configured in the same manner as that of the task execution environment shown in FIG. 4.

Figure 10:
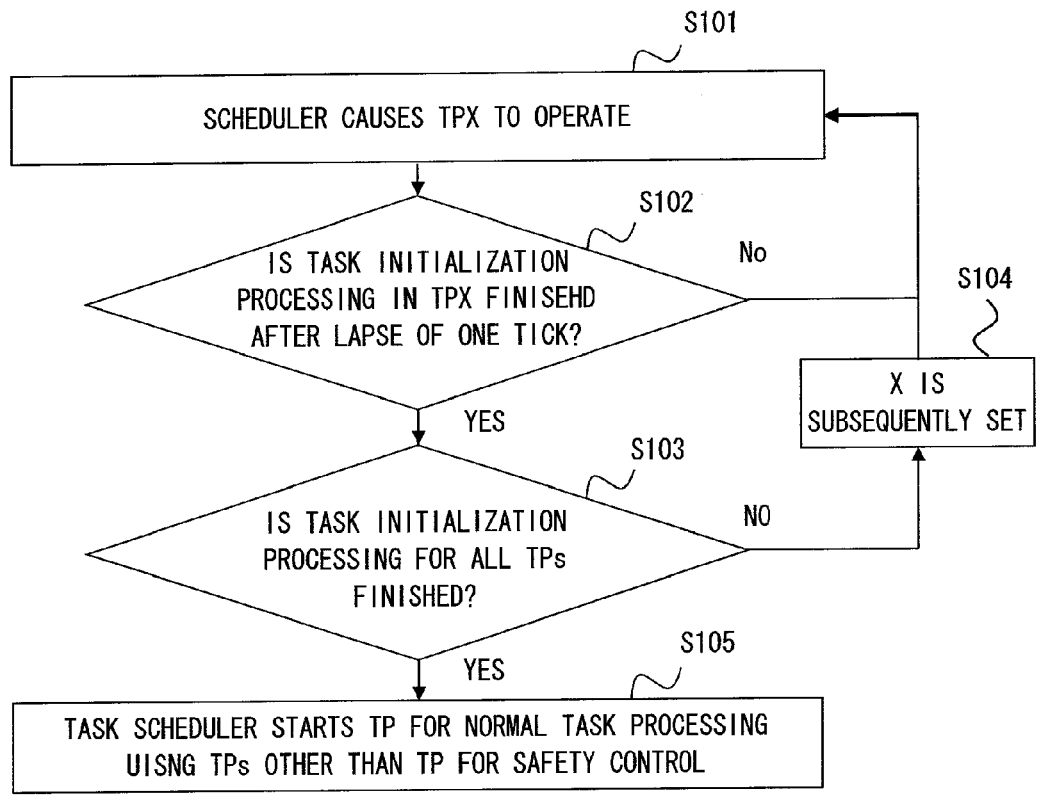
FIG. 10 is a flowchart showing a specific example of a procedure during initialization processing.

Referring next to FIG. 10, the processing of the safety controller 1 according to this embodiment will be described in more detail. FIG. 10 is a flowchart showing a specific example of a procedure of the partition scheduler 21 according to this embodiment. FIG. 10 shows a specific example of a procedure related to task initialization processing of the partition scheduler 21.

First, the partition scheduler 21 that operates every one tick causes the task scheduler in TPX to operate (S101). Here, a variable X represents a TP number, and all types of TPs included in the scheduling pattern are targeted.

The task scheduler in TPX having started operation in S101 executes tasks in TPX, thereby executing the initialization processing for the tasks. Then, after a lapse of one tick, the partition scheduler 21 judges whether the initialization processing for the tasks in TPX has been finished (S102). When the initialization processing for the tasks has not been finished yet (No in S102), the flow returns to S101 to continue the initialization processing for the tasks in TPX. Note that, for example, the partition scheduler 21 may judge whether the initialization processing for the tasks in TPX has been finished, based on the notification of the result of the running status from TPX. In the case where the initialization processing has been finished, the tasks may set a value of a flag to indicate the end of the initialization processing, and the partition scheduler 21 may judge the end according to the value of the flag.

In the case where the initialization processing for the tasks has been finished (Yes in S102), the partition scheduler 21 judges whether the initialization processing for the tasks related to all types of TPs included in the scheduling pattern has been finished (S103). If the initialization processing for the tasks related to all TPs has not been finished yet (No in S103), the partition scheduler 21 switches TPX to a subsequent TPX (S104). As a result, the process returns to S101, and the initialization processing for the tasks in the switched TPX is continued.

In the case where the initialization processing for the tasks related to all TPs has been finished (Yes in S103), the partition scheduler 21 selects and decides TPs other than TP3 as TPX to be activated, thereby allowing the task scheduler to operate in the TPX thus selected and decided (S105). For example, the partition scheduler 21 skips TP3, and executes only TP1 and TP2. As a method for selecting and deciding only TPs other than TP3, the partition scheduler 21 may select decide time partitions other than TP3 when TP3 is a candidate of the time partition to be subsequently activated.

According to this embodiment described above, an execution time is provided to all TPs only during the initialization processing for the tasks. After execution of normal task processing is started, TP3 for executing tasks for safety control is skipped, and only TP1 for executing tasks for safety monitoring and TP2 for executing tasks for normal control can be executed.

Accordingly, under such circumstances that an abnormality hardly occurs after completion of the initialization processing for the tasks related to all TPs, there is no need to execute unnecessary TP3. Consequently, a longer period of time can be allocated as compared to the execution time (TP2) for tasks generated by the normal control program.

Moreover, the present invention is not limited to the above embodiments, and various modifications can be made without departing from the scope of the present invention as described above. For example, the present invention can be carried out singly or in combination of a plurality of embodiments. For example, it is also possible to combine the configurations as described below. That is, the configuration in which an execution time is provided to all TPs during the initialization processing for tasks, and TP3 is skipped and only TP1 and Tp2 are executed after execution of the normal task processing is started, and the configuration in which the scheduling pattern is switched to the scheduling pattern starting from TP3 upon occurrence of an abnormality and TPs other than TP3 are skipped and only tasks in TP3 are executed in the subsequent scheduling.

REFERENCE SIGNS LIST

1 SAFETY CONTROLLER
10 PROCESSOR
11 EXECUTION MEMORY

12 I/O PORT
13 NONVOLATILE MEMORY
14 RESET CIRCUIT
15 MICROCONTROLLER
21 PARTITION SCHEDULER
22 SCHEDULING TABLE
23, 25, 27 TASK SCHEDULER
24 SAFETY MONITORING TASK
26 NORMAL CONTROL TASK
28 SAFETY CONTROL TASK
100 OPERATING SYSTEM
101 SAFETY MONITORING APPLICATION
102 NORMAL CONTROL APPLICATION
103 SAFETY CONTROL APPLICATION

The invention claimed is:

1. A safety controller comprising:
a hardware resource including at least one processor; and
a system program for controlling allocation of an execution time of the processor with respect to (a) a safety monitoring task for motoring occurrence of an abnormality related to a control target, (b) a normal control task related to a control of the control target during normal time, and (c) the safety control task related to the control of the control target upon occurrence of an abnormality, wherein
the system program partially includes: a partition scheduler that selects and decides a time partition to be subsequently scheduled in accordance with a scheduling pattern including: (d) a first time partition in which the execution time is allocated to the safety monitoring task; (e) a second time partition in which the execution time is allocated to the normal control task; and (f) a third time partition in which the execution time is allocated to the safety control task; a first task scheduler for scheduling the safety monitoring task in the first time partition; a second task scheduler for scheduling the normal control task in the second time partition; and a third task scheduler for scheduling the safety control task in the third time partition,
the processor executes the system program to cause the partition scheduler to operate periodically, and
the partition scheduler skips a time partition including a task which need not be executed among time partitions included in the scheduling pattern, in response to a notification of an execution result from a task executed in at least one of the first to third time partitions.

2. The safety controller according to claim 1, wherein, upon receiving the notification of the execution result indicating that an abnormality has been detected by the safety monitoring task executed in the first time partition, the partition scheduler skips time partitions other than the third time partition in a subsequent scheduling.

3. The safety controller according to claim 1, wherein the partition scheduler skips the third time partition in a subsequent scheduling upon execution and completion of task initialization processing in each of the first to third time partitions.

4. The safety controller according to claim 1, further comprising a reset circuit that resets the hardware resource, wherein
the partition scheduler outputs a reset instruction signal to the reset circuit in response to a notification indicating an abnormality including an emergency stop from a task executed in at least one of the first to third time partitions, and
the reset circuit resets the hardware resource upon reception of the reset instruction signal.

5. The safety controller according to claim 1, further comprising a reset circuit that resets the hardware resource, wherein
the partition scheduler periodically transmits a signal to the reset circuit, and suspends transmission of the signal to the reset circuit in response to a notification indicating an abnormality including an emergency stop from a task executed in at least one of the first to third time partitions, and
the reset circuit resets the hardware resource when the transmission of the signal from the partition scheduler is interrupted.

6. A safety control method for a control target, comprising the steps of:
periodically operating to cause a processor to select and decide a time partition to be subsequently scheduled in accordance with a scheduling pattern including (a) a first time partition in which an execution time of the processor is allocated to a safety monitoring task for monitoring occurrence of an abnormality related to the control target, (b) a second time partition in which the execution time is allocated to a normal control task related to a control for the control target during normal time, and (c) a third time partition in which the execution time is allocated to a safety control program related to the control for the control target upon occurrence of an abnormality; and
scheduling, in the time partition, tasks to which the execution time is allocated in the time partition; and
operating to cause the processor to skip a time partition including a task which need not be executed among time partitions included in the scheduling pattern, in response to a notification of an execution result from a task executed in at least one of the first to third time partitions.

7. The safety control method according to claim 6, further comprising the step of operating to cause the processor to skip time partitions other than the third time partition in a subsequent scheduling, upon reception of the notification of the execution result indicating that an abnormality has been detected by the safety monitoring task executed in the first time partition.

8. The safety control method according to claim 6, further comprising the step of operating to cause the processor to skip the third time partition in a subsequent scheduling, upon execution and completion of task initialization processing in each of the first to third time partitions.

9. The safety control method according to claim 6, further comprising a reset circuit that resets a hardware resource including the processor,
wherein the safety control method further comprises the steps of:
outputting a reset instruction signal to the reset circuit in response to a notification indicating an abnormality including an emergency stop from a task executed in at least one of the first to third time partitions; and
resetting the hardware resource using the reset circuit upon reception of the reset instruction signal.

10. The safety control method according to claim 6, further comprising a reset circuit that resets a hardware resource including the processor,
wherein the safety control method further comprises the steps of:
periodically transmitting a signal to the reset circuit, and suspending transmission of the signal to the reset circuit in response to a notification indicating an abnormality including an emergency stop from a program task executed in at least one of the first to third time partitions; and resetting the hardware resource using the reset circuit when the transmission of the signal is interrupted.

* * * * *